United States Patent
Maningo et al.

(10) Patent No.: US 7,798,453 B2
(45) Date of Patent: Sep. 21, 2010

(54) BORESIGHT APPARATUS AND METHOD OF USE

(75) Inventors: Jessie Ian Maningo, Zion, IL (US); Christopher Lee Abbott, Round Lake Beach, IL (US); James Robert Lutz, Gurnee, IL (US)

(73) Assignee: Quickset International, Inc., Northbrook, IL (US)

( * ) Notice: Subject to any disclaimer, the term of this patent is extended or adjusted under 35 U.S.C. 154(b) by 267 days.

(21) Appl. No.: 11/899,855

(22) Filed: Sep. 7, 2007

(65) Prior Publication Data
US 2009/0065666 A1 Mar. 12, 2009

(51) Int. Cl.
*F16M 11/02* (2006.01)
(52) U.S. Cl. .................. 248/178.1; 248/285.1; 396/428
(58) Field of Classification Search ................. 248/646, 248/652, 653, 656, 657, 662, 133, 371, 393, 248/187.1, 285.1, 274, 178.1; 396/392, 332, 396/428; 73/1.75
See application file for complete search history.

(56) References Cited
U.S. PATENT DOCUMENTS

| | | | | |
|---|---|---|---|---|
| 4,533,105 A * | 8/1985 | Cornwell et al. | ............ | 248/371 |
| 4,838,509 A * | 6/1989 | Klink et al. | .................. | 248/393 |
| 5,933,668 A | 8/1999 | Hyers | | |
| 7,185,862 B1 * | 3/2007 | Yang | ........................ | 248/187.1 |
| 7,614,805 B2 * | 11/2009 | Showalter | .................... | 396/428 |
| 2005/0092884 A1 * | 5/2005 | Lin | ......................... | 248/285.1 |
| 2006/0110151 A1 * | 5/2006 | Sukenari et al. | ............. | 396/155 |
| 2006/0269278 A1 * | 11/2006 | Kenoyer et al. | ............. | 396/428 |
| 2007/0248353 A1 * | 10/2007 | Chen | .......................... | 396/428 |
| 2009/0179127 A1 * | 7/2009 | Pettey | ..................... | 248/276.1 |

* cited by examiner

*Primary Examiner*—Ramon O Ramirez
(74) *Attorney, Agent, or Firm*—Pauley Petersen & Erickson

(57) ABSTRACT

This invention relates to an apparatus for boresighting a device with respect to a fixed position and/or a boresight of another device. Typical devices include various types of cameras, firearms and/or antennas. The apparatus includes a first plate and a second plate movable with respect to each other and a fixed location by a pivot rod. The first plate and the second plate are locked with respect to each other by at least one fastener. The apparatus includes adjustment of the pitch angle and the yaw angle of the device. This invention also relates to a method of boresighting a device with respect to the boresight of a second device.

22 Claims, 7 Drawing Sheets

BORESIGHT APPARATUS AND METHOD OF USE

BACKGROUND OF THE INVENTION

1. Field of the Invention

This invention relates to an apparatus for boresighting or aligning a device with respect to a fixed position and/or a boresight of another device.

2. Description of Related Art

Known boresighting techniques improve accuracy of firearms. A light or a laser is placed within the firearm barrel in a direction extending from the firearm. An optical sight on the firearm is adjusted based on the projected beam.

Other known uses of boresighting include alignment of avionic equipment in an airframe.

Cameras and other devices also have a boresight that requires adjustment or calibration, especially when coupled with one or more other devices.

Conventional boresighting devices either lack refinement and desired accuracy or are difficult to adjust. Known boresighting devices do not adjust in only one direction at a time. Other known boresighting devices require application of significant force, such as with a rubber mallet when pieces become bound or stuck to each other.

There is a need for a boresighting apparatus that is accurate and easy to adjust.

SUMMARY OF THE INVENTION

Accordingly, it is one object of this invention to provide an apparatus to allow boresighting a device with respect to a fixed position in a manner that is serviceable and/or retrofitable to one or more devices.

It is another object of this invention to provide an accurate apparatus for boresighting a device with respect to a second device, such as for an overlapping or side by side field of view.

These and other objects of this invention are addressed by an apparatus for boresighting a device relative to a fixed position including a first plate receiving the device, a second plate mounting to the fixed position, a pivot rod adjustably engaging the first plate with respect to the second plate, and at least one fastener fixing the first plate with respect to the second plate. Typically, the apparatus allows adjustment of the first plate with respect to the second plate by changing the yaw angle, left and right, or the pitch angle, up and down. Two degrees of freedom may provide the desired alignment options.

The pivot rod may have a generally cylindrical shape and may be disposed generally transverse with respect to the first plate and the second plate. According to a preferred embodiment of this invention, the second plate includes at least one sidewall, such as to receive at least a portion of the first plate and/or mount a fastener. Desirably, the second plate includes at least one recess to receive at least a portion of the generally cylindrical shape of the pivot rod.

Alternately, the apparatus includes an adjustment rod positioned within a portion of the first plate to prevent binding of the first plate with respect to the second plate. The adjustment rod may form an antibinding configuration and eliminate the application of excessive force, such as from a rubber mallet when adjusting the boresight.

The fastener may include a front bolt and a rear bolt, such as adjusting the pitch angle. The fastener may further include a side screw and an opposite side screw, such as adjusting the yaw angle. According to a preferred embodiment of this invention the faster includes one quarter inch diameter bolts with 28 threads per inch, spherical washers and/or thumb screws.

Suitable devices for apparatus 10 may include visible-light cameras, infrared cameras, laser finders, global positioning systems, visual recognition devices, lights, microphones, radar transceivers and radio wave antennas.

Optionally, the apparatus mounts to a pan and tilt to increase functionality and/or movement. A pan and tilt provides movement with respect to at least two axes of rotation.

Calibrating the boresight of a first device with respect to a second device may include intersecting the boresight at a calibration distance such as about 200 m to about 700 m away from the devices. Intersecting the respective boresights may form a partially or completely overlapping redundant image. Alternately, boresights may be aligned at least generally parallel to form a side by side image. There is no limit as to the number or types of devices combinable. Redundant images or signals are especially desirable when combining different types or functions of devices, such as a visible light camera and an infrared camera.

The invention also relates to a method for boresighting a first device with respect to a boresight of a second device which includes mounting the first device on a first plate of an apparatus which adjustably engages a second plate by a pivot rod and the second plate mounts with respect to a pan and tilt. The method may also include mounting the second device on the pan and tilt, calibrating least one of the yaw angle and the pitch angle of the first plate with respect to the second plate, and fixing the position of the first plate with respect to the second plate by at least one fastener.

According to other embodiments of the invention, the method may include the steps of loosening a front fixing bolt, a back fixing bolt, a side fixing screw and an opposite side fixing screw; moving the first plate to adjust the yaw angle to the desired position of the first plate before tightening the side fixing screw and/or the opposite side fixing screw; and moving the first plate to adjust the pitch angle to the desired position of the first plate with respect to the pivot rod by moving the back fixing bolt and then tightening the front fixing bolt. Alternately, the method may include tightening the side fixing screw and the opposite side fixing screw after tightening the front fixing bolt.

BRIEF DESCRIPTION OF THE DRAWINGS

These and other objects and features of this invention will be better understood from the following descriptions taken in conjunction with the drawings wherein.

DETAILED DESCRIPTION OF THE PREFERRED EMBODIMENTS

Figure 4:
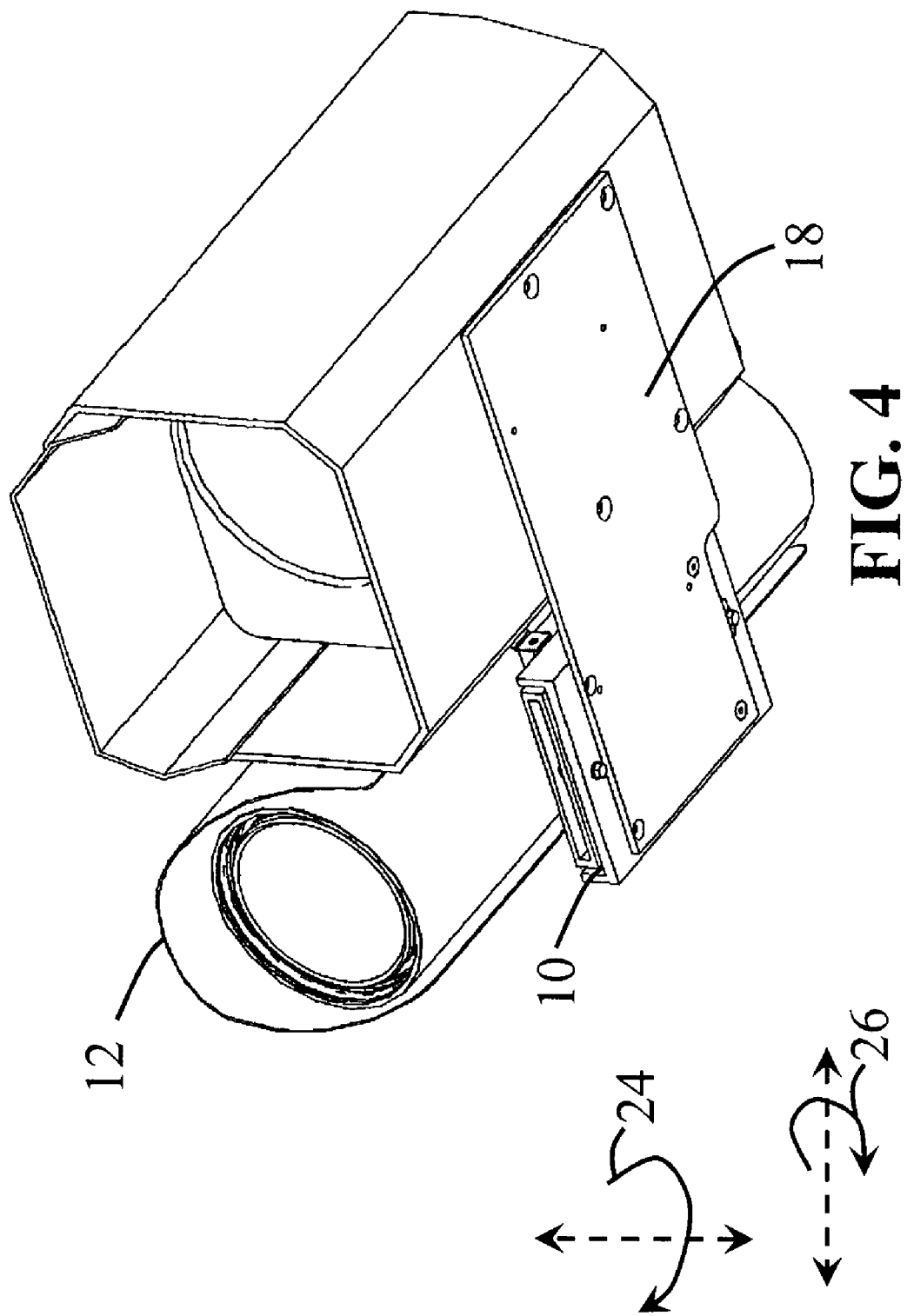
FIG. 4 is an assembled view with a first device and a second device with a boresighting apparatus, according to one preferred embodiment of this invention.

Boresight 66 (FIG. 5) includes the optical or physical axis of a device 12 (FIG. 4), such as, for example, scopes, magnifying scopes, view finders, laser finders, cameras, visible-light cameras, infrared cameras, global positioning systems, targeting acquisition systems, visual recognition systems, mapping systems, scanning systems, lighting systems, firearms, lasers, speakers, microphones, satellite receivers, radio wave antennas and/or any other suitable mountable items. Devices 12 may include fixed and/or variable focal length capabilities, such as a zoom lens.

Mounting and/or receiving of devices 12 may include to stationary objects such as buildings, structures or any other relatively stationary or non-moving location, and mounting of devices 12 may include to mobile or portable objects such as vehicles, cranes or any other relatively non-anchored location.

Boresight 66 or line of extension includes line-of-sight and field of view with respect to the perspective of device 12. Properly calibrating, adjusting, aligning and/or setting-up boresight 66 of device 12 may improve accuracy, reception, recognition and/or any other desired characteristic, for example, reducing a distance from the center of a target for a missile or other projectile.

According to a preferred embodiment of this invention, boresight 66 includes the view of a camera, typically, but not necessarily, at a distance from a front of the camera.

The term "calibration distance" 68 (FIG. 5) refers to a point at a fixed distance in front of device 12 with boresight 66. Calibration distance 68 may be any suitable distance, for example, from a few centimeters away to distances of a kilometer or more. A preferred camera may utilize a calibration distance of about 100 m to about 1,000 m, preferably about 200 m to about 700 m, and more preferably about 300 m to about 500 m.

One or more devices 12 may be used at the same time, such as, for example, to increase a field of view by placing two or more cameras essentially next to each other forming a side by side configuration or arrangement. Three dimensional or stereo imagery can be made using multiple devices 12 looking at the same object from a different perspective. Any desired number of devices 12 may be arranged with respect to each other to achieve or accomplish the desired result, including an array and/or a panoramic view.

Similarly, devices 12 may be configured in an overlay or redundant arrangement. This overlay arrangement can be useful when combining signals from different types of devices, such as, for example, a visible-light camera and an infrared (night vision) camera, a camera and a directional microphone, a laser and a digital scanner, and/or any other suitable combination of complimentary and/or supplementary devices 12. Other suitable arrangements of partial overlapping or spacing of images may be utilized.

Figure 1:
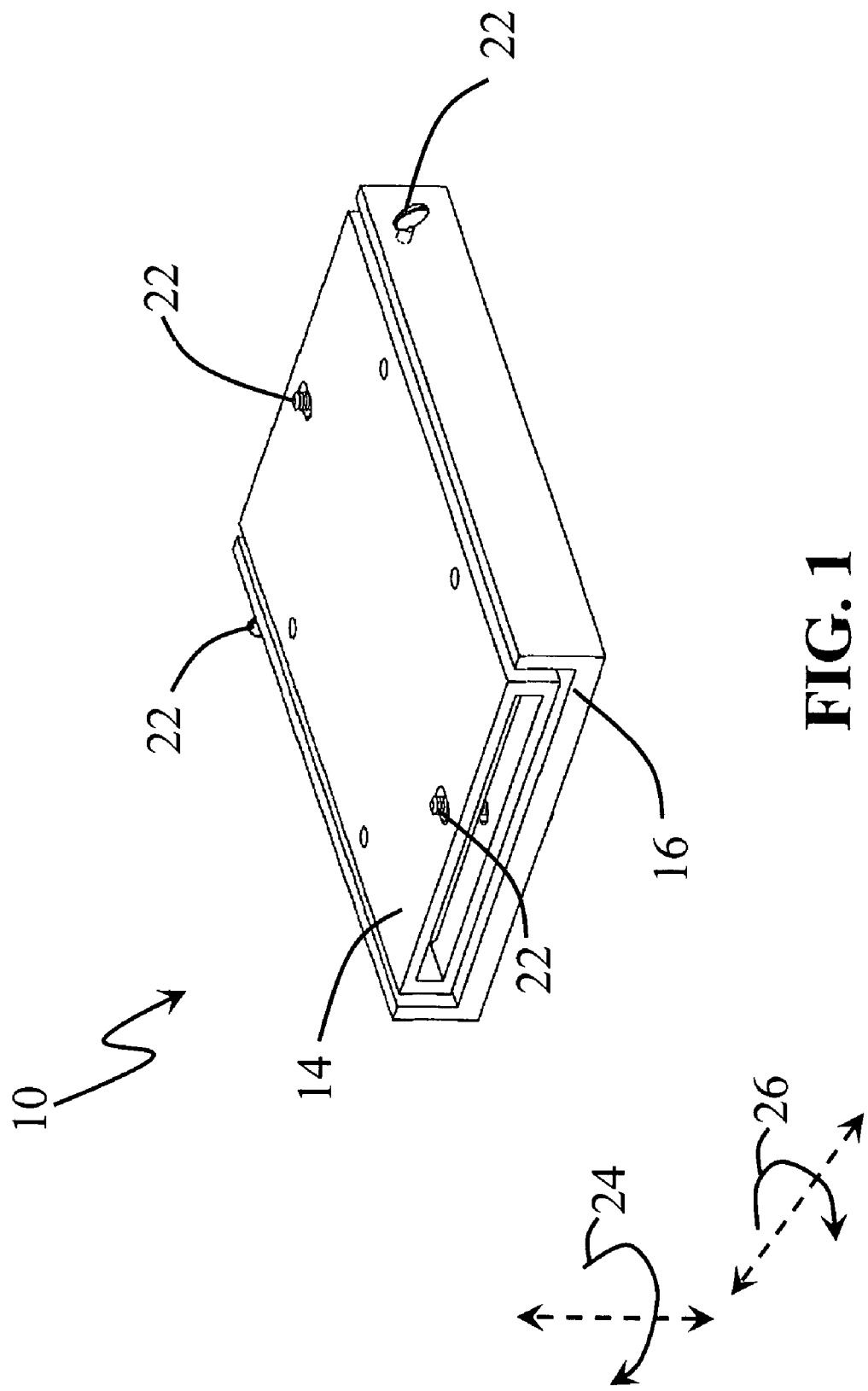
FIG. 1 is an isometric assembled view of a boresighting apparatus, according to one preferred embodiment of this invention.

According to a preferred embodiment and as shown in FIG. 1, apparatus 10 for the boresighting of device 12 (FIG. 4) may include any suitable combination of parts and/or linkages to provide movement or adjustment in at least one direction or vector of boresight 66 (FIG. 5) with respect to a fixed position, such as, for example, the attachment of a second camera to an adapter plate.

Desirably, apparatus 10 includes or provides one or more degrees of freedom to aid or assist the boresighting of device 12. Degrees of freedom include a range of motion, such as without limitation, forward and backward, side to side, up and down, axially about a generally horizontal axis, axially about a vertical axis and/or any other suitable movement.

According to a preferred embodiment of this invention, apparatus 10 includes adjustment in, about and/or along a generally horizontal axis and a generally vertical axis.

The term "yaw angle" 24, as indicated by the arrow in FIG. 1, includes the twisting or turning about and/or circumferentially around a generally vertical axis, such as a right and left panning or sliding motion with respect to a fixed position.

Figure 2:
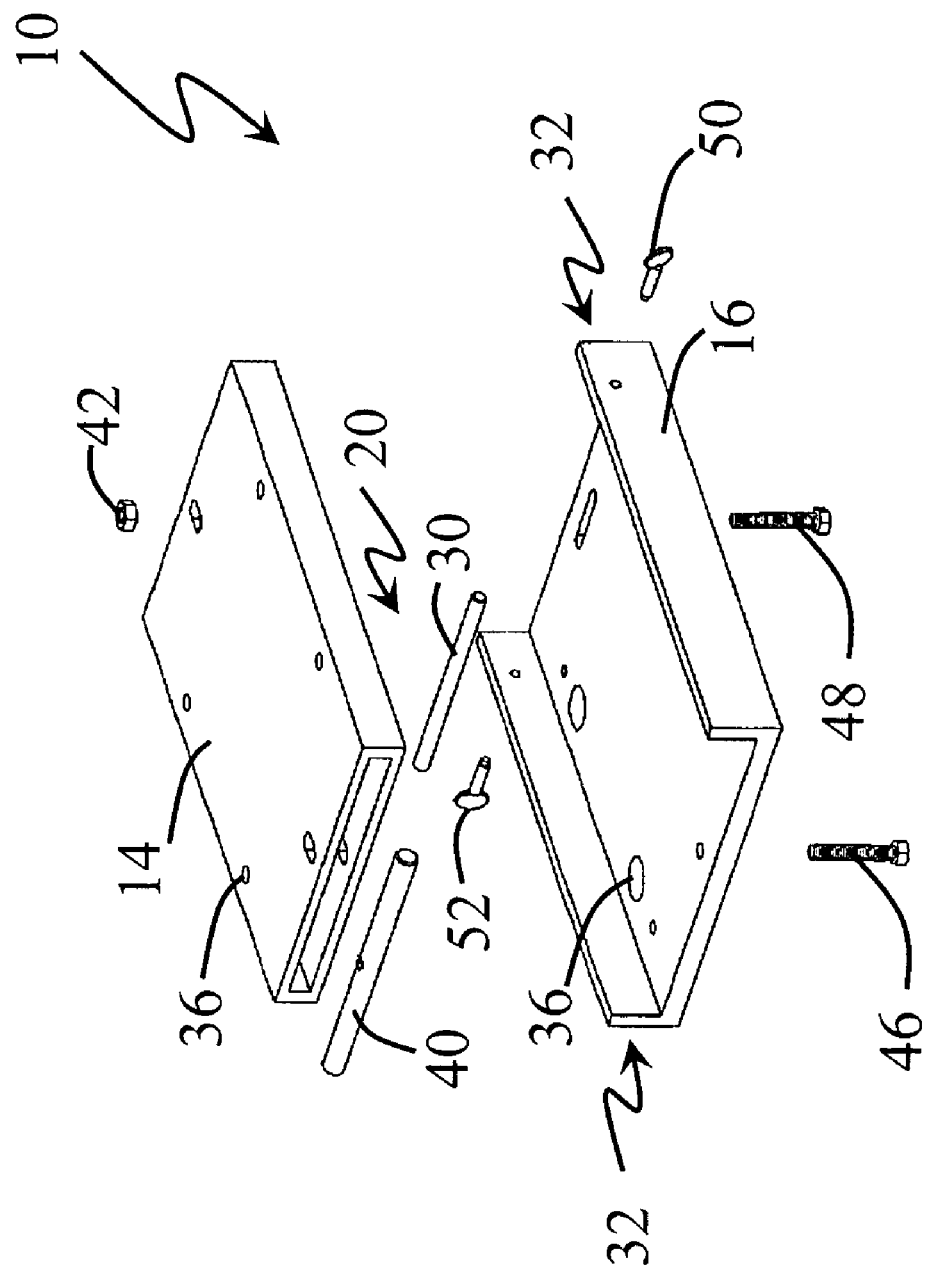
FIG. 2 is an isometric exploded view of a boresighting apparatus, according to one preferred embodiment of this invention.

The term "pitch angle" 26, as indicated by the arrow in FIG. 2, includes the twisting or turning about and/or circumferentially around a generally horizontal transverse axis, such as an up and down panning or sliding motion with respect to a fixed position.

The term "roll angle", not shown, includes the twisting or turning about and/or circumferentially around a generally horizontal longitudinal axis, such as a leaning or tilting sideways panning or sliding motion with respect to a fixed position.

The term "transverse" refers to a generally perpendicular direction with respect to boresight 66 of device 12.

The term "longitudinal" refers to a generally parallel and/or coincident direction with respect to boresight 66 of device 12.

Apparatus 10 may include first plate 14 and second plate 16 which desirably move with respect to each other by and/or with pivot rod 20 (FIG. 2). A position of first plate 14 with respect to second plate 16 may be held, fixed, locked and/or secured with one or more fasteners 22, such as two fasteners 22 for each degree of freedom.

First plate 14 may include a generally planar shape of any suitable size or dimension, such as a base the size of device 12. First plate 14 may be any suitable material, such as steel, stainless steel, aluminum alloy, plastic, reinforced plastic and any other relatively durable material. Desirably, first plate 14 comprises a relatively light-weight, durable, weather resistant member.

According to a preferred embodiment of this invention, and as shown in FIG. 2, first plate 14 includes one or more bores 36, such as for mounting device 12. Bores 36 may include any suitable size and/or shape while being threaded or unthreaded, with or without counterbores.

Figure 3:
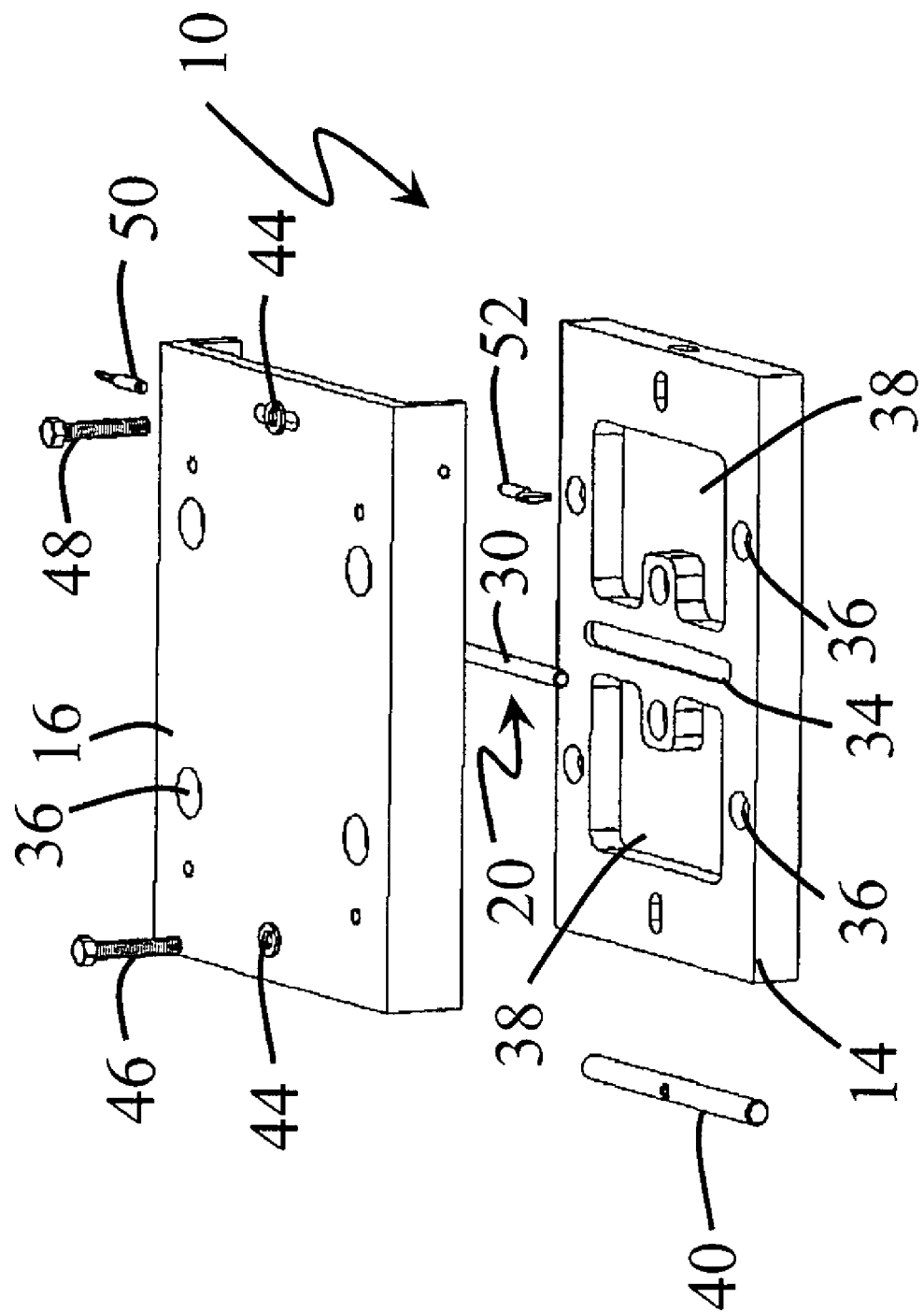
FIG. 3 is an isometric exploded view of a boresighting apparatus, according to one preferred embodiment of this invention.

Desirably, first plate 14 includes slots and/or cut outs to engage and/or hold at least a portion of a fastener 22, such as shown in FIG. 3. First plate 14 may include one or more cavities 38, gussets, fillets, chamfers and/or any other suitable reinforcing structural members.

Second plate 16 may include any and/or all of the characteristics and features discussed above with respect to first plate 14. Second plate 16 may further include sidewalls 32 to form a channel or channel like structure, such as for receiving at least a portion of first plate 14. Sidewalls 32 may include holes, such as threaded connections to receive fastener 22.

Apparatus 10 may include covers, shields, drains, gasketing, weatherproofing and any other suitable element to aid or facilitate apparatus 10 in the desired operating conditions or environment. According to a preferred embodiment of this invention, apparatus 10 is at least substantially self draining and not prone to ice build up, such as from freezing and thawing that displaces the first plate from the second plate when installed outside in a northern climate.

The physical geometry of first plate 14 and second plate 16 may limit yaw angle 24 to a relatively narrow range of motion, such as about 5 degrees left or right, and/or up or down. Desirably, the range of motion includes at least about 2.5 degrees, preferably at least about 10 degrees, and most preferably at least about 15 degrees, in either direction of left and/or right movement or motion, such as when a corner of first plate 14 contacts sidewall 32 as a limit. Alternately, first plate 14 may include a contoured, round and/or rounded shape, such as may allow increased yaw angles 24 including 360 degrees of freedom or rotation.

Pivot rod 20 may include a bearing, a roller and/or any other suitable movement-allowing coupling. Pivot rod 20 may include any suitable size and/or shape. A larger diameter rod typically may result in an increased adjustment of pitch angle 26.

According to a preferred embodiment of this invention, pivot rod 20 may have a generally cylindrical shape 30, such as to allow adjustment of pitch angle 26 about or with respect to pivot rod 20. Pivot rod 20 desirably, but not necessarily, includes adjustment of yaw angle 24 and pitch angle 26 with no or without a significant amount of roll angle adjustment.

Typically, pivot rod 20 acts a fulcrum or pivot point for pitch angle 26. Yaw angle 24 may be adjusted as at least one of the first plate 14 or the second plate 16 rotates on a generally tangential contact point or contact line of pivot rod 20. Desirably, pivot rod 20 allows about at least 2 degrees, preferably at least about 10 degrees, and most preferably at least about 15 degrees or more of up and/or down motion or movement, such as before first plate 14 contacts 16.

Pivot rod 20 may further include any suitable lubricating substances such as a lubricating oil, grease, lithium grease, silicon grease and/or any other suitable friction-reducing compound. Lubricating substances may also help or assist in maintaining a position or location of pivot rod 20, such as during field installation.

According to a preferred embodiment of this invention and as shown in FIG. 3, first plate 14 and/or second plate 16 may include recess 34, seat and/or groove to receive or accept at least a portion of pivot rod 20. Desirably, recess 34 includes a sufficient width to allow adjustment of yaw angle 24 without significant binding and/or misalignment of first plate 14 with respect to second plate 16. Alternately, recess 34 includes a tight fit with pivot rod 20 to allow little or no slop or play in the assembly.

Fastener 22 may include any suitable anchoring, affixing, attaching and/or locking device. Common fasteners include hand or tool operable mechanical unions, such as, for example, screws, cap screws, thumb screws 64 (FIG. 6), bolts, hex bolts, nuts, lock nuts, washers, lock washers, spherical washers 70 (FIG. 7), clevis pins, and any other suitable mechanism. Fasteners 22 may include additional materials, such as adhesive thread locking compounds used to prevent vibration related loosening. Fastener 22 may also include more permanent items, such as welds, urethane adhesives and epoxy adhesives.

Fastener 22 can be of any desired size or dimension in any suitable material. Suitable materials may include steel, carbon steel, stainless steel, nylon, alloys, and any other relatively high tensile strength material. Typically, but not necessarily, fastener 22 forms a physical union between first plate 14 and second plate 16.

Desirably, fastener 22 can be calibrated to correspond to associated movement of device 12, such as, for example, a quarter turn of fastener 22 results in a half a degree of movement of yaw angle 24. Generally, tighter tolerances, such as a finer thread may allow finer calibration than a coarse thread.

According to a preferred embodiment of this invention and as shown in FIG. 2, fastener 22 includes front bolt 46, rear bolt 48, nut 42, washer 44, adjustment rod 40, side screw 50 and opposite side screw 52. Desirably, adjustment rod 40, in combination with a receiving slot or groove, allows first plate 14 and second plate 16 to adjust with respect to each other without binding or grabbing of fastener 22 in a location or position other than desired. Alternately, spherical washers 70 may provide adjustment without binding of first plate 14 and second plate 16. Other non-binding or anti-seizing arrangements or configurations are possible.

According to a preferred embodiment of this invention and as shown in FIGS. 2-3, apparatus 10 includes front bolt 46 and rear bolt 48, such as to fix and/or set pitch angle 26. Front bolt 46 and rear bolt 48 may include any of the qualities and/or characteristics discussed above with respect to fastener 22. According to a preferred embodiment of this invention, front bolt 46 and rear bolt 48 may include one quarter inch diameter bolts with 28 threads per inch. Other diameters of standard, English or metric devices in varying thread pitches and/or lengths are possible.

Desirably, front bolt 46 engages at least a portion of first plate 14 and/or at least a portion of second plate 16 to at least partially affix first plate 14 with respect to second plate 16, such as when adjusted or tightened in combination with rear bolt 48. Generally, front bolt 48 couples with adjustment rod 40, spherical washers 70, spherical nut, nut 42 and/or any other suitable antiseizing or antibinding configuration or device.

Rear bolt 48 may include any of the qualities and/or characteristics discussed above with respect to front bolt 46. According to a preferred embodiment of this invention, rear bolt engages first plate 14 and second plate 16 with nut 42, such as a hex nut of corresponding diameter and thread pitch to rear bolt 48. Front bolt 46 and rear bolt 48 may also engage washer 44, such as a flat washer or a lock washer. Generally, at least a portion of nut 42 resides within a slot, recess or groove of second plate 16.

Adjustment rod 40 may include a generally cylindrical shape having a substantially circular cross section and/or any other suitable antibinding geometry. Typical antibinding geometries include pivot points, rotation areas, sliding regions and/or any other suitable configuration to allow or facilitate movement of one member with respect to another, such as when fastener 22 is disengaged. Desirably, adjustment rod 40 includes a threaded hole to engage at least a portion of front bolt 46. Generally, at least a portion of adjustment rod 40 resides within a slot, recess, or groove of second plate 16.

Figure 6:
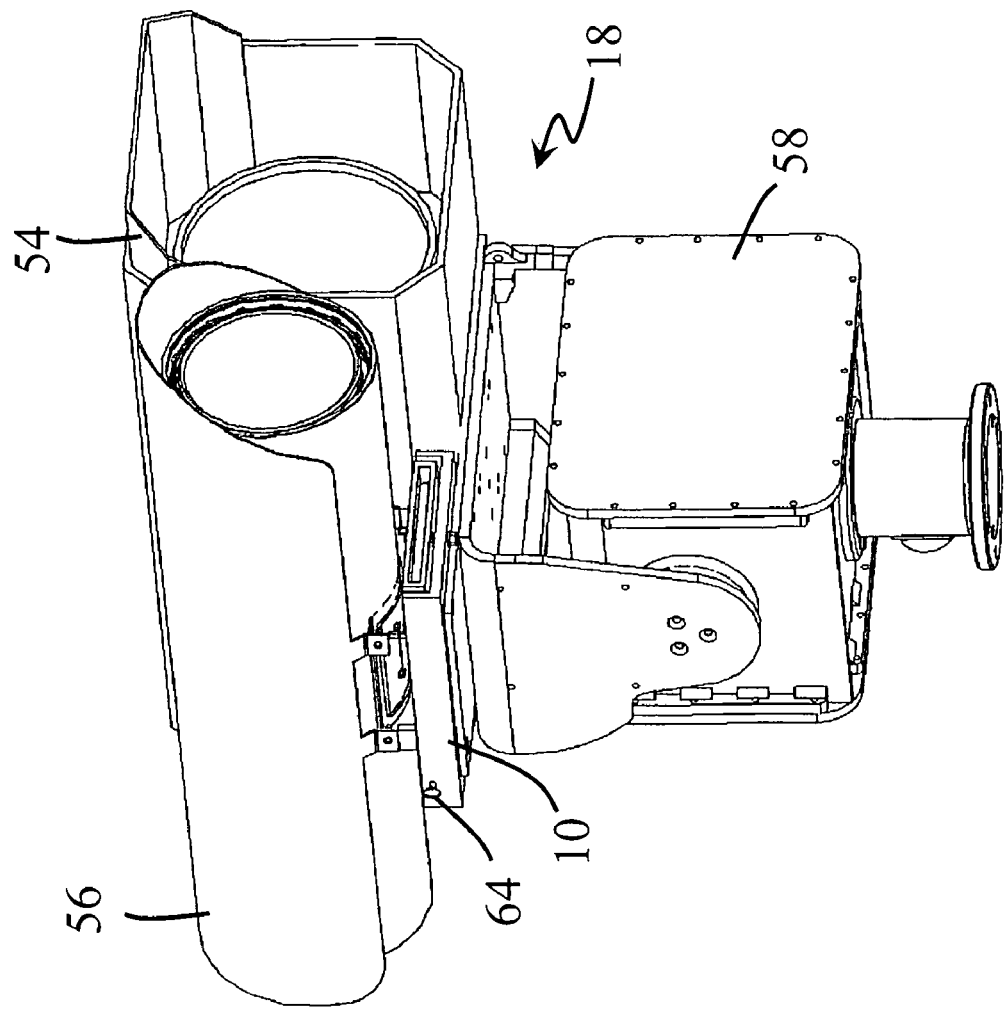
FIG. 6 is an assembled view with a first device and a second device with a boresighting apparatus mounting to a pan and tilt, according to one preferred embodiment of this invention.
Figure 7:
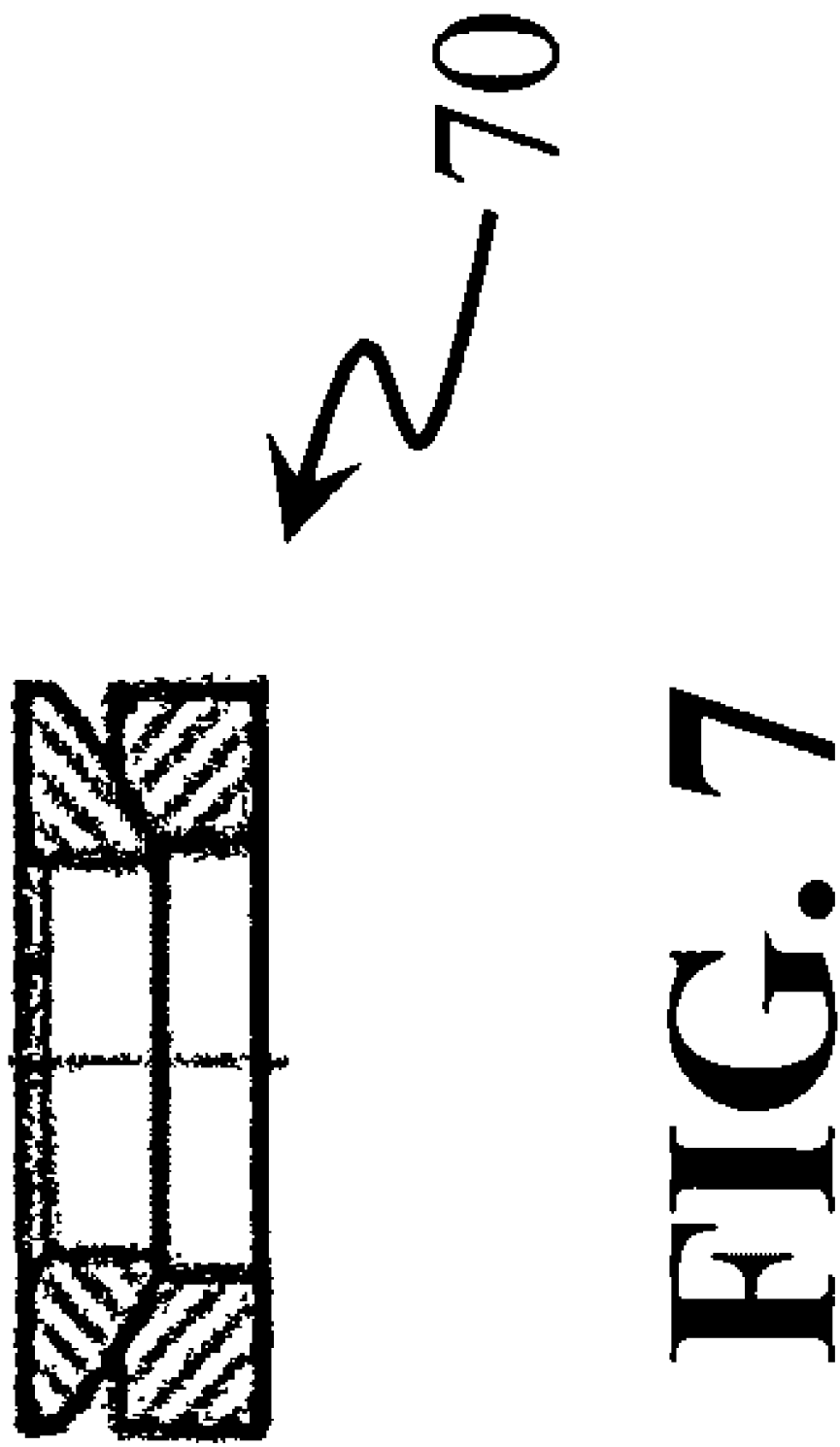
FIG. 7 is a side sectional view of spherical washers according to one preferred embodiment of this invention.

According to a preferred embodiment of this invention and as shown in FIGS. 2-3, apparatus 10 includes side screw 50 and opposite side screw 52, such as to fix and/or set yaw angle 24. Side screw 50 and opposite side screw 52 may include all the characteristics discussed above with respect to fastener 22, front bolt 46 and/or rear bolt 48. According to a preferred embodiment of this invention, side screw 50 and opposite side screw 52 do not require tools, such as for field adjustment. Desirably, side screw 50 and opposite side screw 52 include thumb screws 64 (FIG. 6).

Typically, side screw 50 engages at least a portion of first plate 14 and/or at least a portion of second plate 16 to at least partially affix first plate with respect to second plate when adjusted or tightened in combination with opposite side screw 52. Side screw 50 and opposite side screw 52 may thread into or engage at least a portion of sidewall 32.

Generally, but not necessarily, apparatus 10 mounts to structure 18 (FIG. 4), such as, for example a mounting plate, an adapting plate and/or any other suitable body or member. Desirably, structure 18 includes one or more devices 12 mounting or anchoring to and/or upon it. Typically, at least one of devices 12 has at least a portion of apparatus 10 between and/or connecting structure 18 and device 12.

Any number or combination of suitable spacer, washers or blocks may mount device 12. Such as, a block having about the same dimensions of apparatus 10 for boresighting a first device 60 being placed under second device 62.

Figure 5:
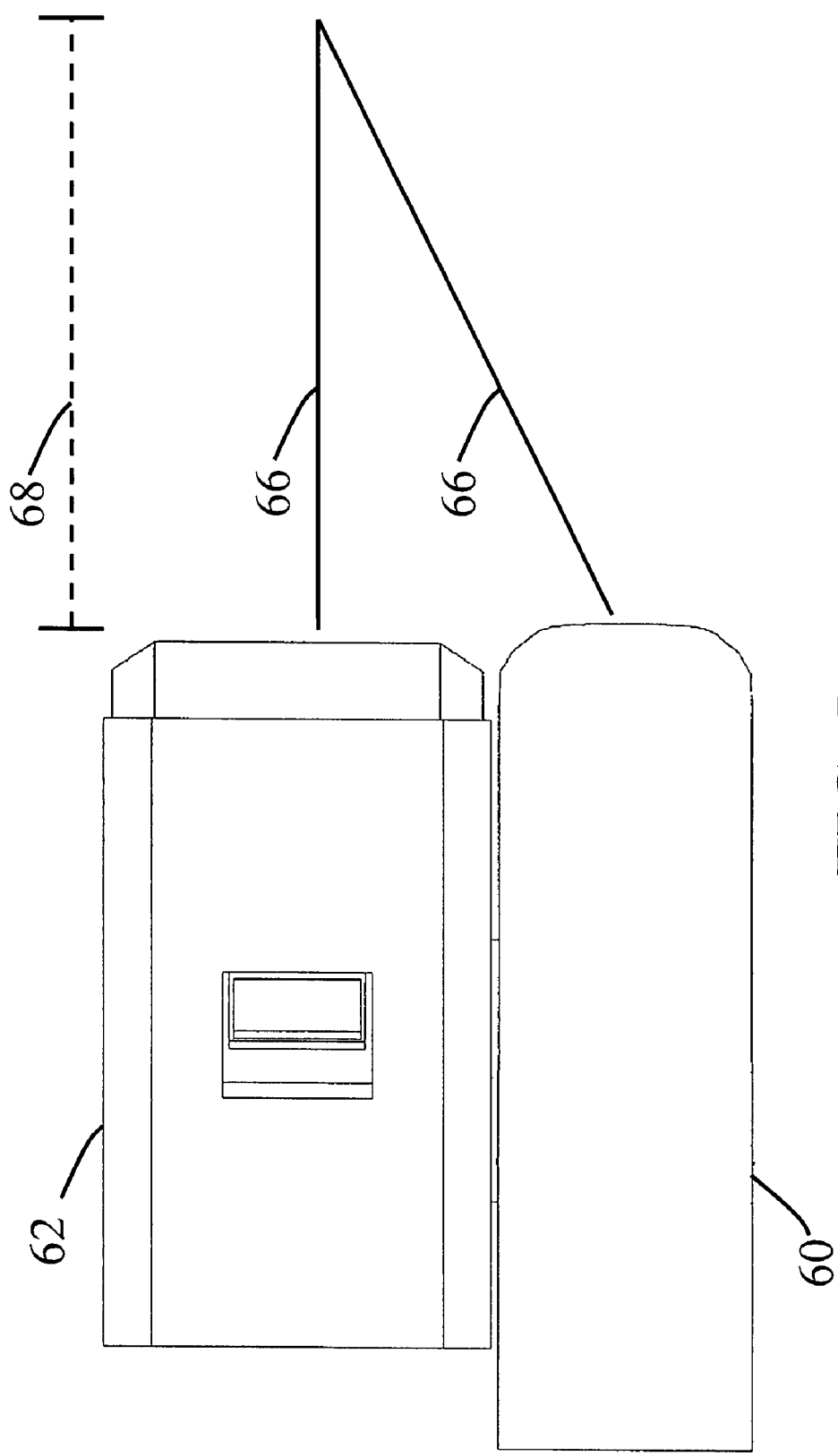
FIG. 5 is an assembled view with a first device and a second device with a boresighting apparatus, according to one preferred embodiment of this invention.

FIG. 5 shows first device 60 having boresight 66 and second device 62 having boresight 66. Desirably, first device 60 resides or sits on apparatus 10 to allow adjustment of boresight 66, such as intersecting the boresight 66 of second device 62 at calibration distance 68 or fixed position away from or in front of devices 60, 62. The arrangement depicted in FIG. 5 results in an overlapping boresight, such as forming a redundant image. Redundant images may include signals from visible light camera 54 and infrared camera 56, such as, for example, as shown in FIG. 6.

According to a preferred embodiment of this invention, structure 18 further includes pan and tilt 58. Pan and tilt 58 desirably provides at least two axes of controlled movement with one or more mechanical, electrical, pneumatic and/or hydraulic actuators.

This invention also includes methods of boresighting one or more devices 12. According to a preferred embodiment, the method for boresighting a first device 60 with respect to a boresight 66 of second device 62 includes mounting first device 60 on first plate 14 of apparatus 10, wherein the first plate 14 adjustably engages second plate 16 by pivot rod 20 and second plate 16 mounts with respect to pan and tilt 58. Second device 62 mounts on pan and tilt 58. The method also includes calibrating least one of yaw angle 24 and pitch angle 26 of first plate 14 with respect to second plate 16 and fixing the position of first plate 14 with respect to second plate 16 by at least one fastener 22.

Calibrating may include intersecting boresight 66 of first device 60 with boresight 66 of second device 62. Alternately, calibrating may include aligning boresights 66 at least generally parallel with respect to each other.

Without dictating a limiting order or number of steps, the method may include loosening front bolt 46, back bolt 48, side screw 50 and opposite side screw 52, moving first plate 14 to adjust yaw angle 24 to the desired position of first plate 14 before tightening side screw 50 and opposite side screw 52. The method may also include moving first plate 14 to adjust pitch angle 26 to the desired position of first plate 14 with respect to pivot rod 20 by moving back bolt 48 and then tightening front bolt 46. Alternately, the method may include tightening side screw 50 and opposite side screw 52 after tightening front fixing bolt 46.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. An apparatus for boresighting a device relative to a fixed position, the apparatus comprising:
   a first plate receiving the device;
   a second plate mounting to the fixed position;
   a pivot rod adjustably engaging the first plate with respect to the second plate; and
   at least one fastener fixing at least one of a yaw angle or a pitch angle of the first plate with respect to the second plate, wherein the fastener includes a front bolt and a rear bolt adjusting the pitch angle.

2. The apparatus for boresighting a device relative to a fixed position of claim 1, wherein the pivot rod comprising a generally cylindrical shape disposed generally transverse with respect to the first plate and the second plate.

3. The apparatus for boresighting a device relative to a fixed position of claim 2, wherein the second plate further comprising sidewalls.

4. The apparatus for boresighting a device relative to a fixed position of claim 3, wherein the second plate comprising a recess receiving at least a portion of the generally cylindrical shape.

5. The apparatus for boresighting a device relative to a fixed position of claim 3, wherein the sidewalls of the second plate receiving at least a portion of the first plate.

6. The apparatus for boresighting a device relative to a fixed position of claim 1, further comprising an adjustment rod positioned within a portion of the first plate to prevent binding of the first plate with respect to the second plate.

7. The apparatus for boresighting a device relative to a fixed position of claim 1, wherein the fastener includes a side screw and an opposite side screw adjusting the yaw angle.

8. The apparatus for boresighting a device relative to a fixed position of claim 1, wherein the device is selected from the group consisting of visible-light cameras, infrared cameras, laser finders, global positioning systems, visual recognition devices, lights, microphones, radar transceivers, radio wave antennas and combinations thereof.

9. The apparatus for boresighting a device relative to a fixed position of claim 1, wherein the apparatus mounts to a pan and tilt.

10. An apparatus for boresighting a first device with respect to a boresight of a second device, the apparatus comprising;
    a first plate receiving the first device;
    a pan and tilt receiving the second device;
    a second plate mounting with respect to the pan and tilt;
    a pivot rod adjustably engaging the first plate with respect to the second plate; and
    at least one fastener fixing at least one of a yaw angle or a pitch angle of the first plate with respect to the second plate, wherein the boresight of the first device with respect to the boresight of the second device adjusts with the yaw angle and the pitch angle of the first plate with respect to the second plate.

11. The apparatus for boresighting a first device with respect to a boresight of a second device of claim 10, wherein the at least one fastener comprising one quarter inch diameter bolts with 28 threads per inch.

12. The apparatus for boresighting a first device with respect to a boresight of a second device of claim 10, wherein the at least one fastener comprising thumb screws for fixing the yaw angle of the first plate with respect to the second plate.

13. The apparatus for boresighting a first device with respect to a boresight of a second device of claim 10, wherein the first device having a boresight intersecting the boresight of the first device at a calibration distance away from the apparatus.

14. The apparatus for boresighting a first device with respect to a boresight of a second device of claim 10, wherein the at least one fastener comprising spherical washers.

15. An apparatus for boresighting a device relative to a fixed position, the apparatus comprising:

a first plate receiving the device;

a second plate mounting to the fixed position;

a pivot rod adjustably engaging the first plate with respect to the second plate; and at least one fastener fixing at least one of a yaw angle or a pitch angle of the first plate with respect to the second plate, wherein the fastener includes a side screw and an opposite side screw adjusting the yaw angle.

16. The apparatus for boresighting a device relative to a fixed position of claim 15, wherein the pivot rod comprising a generally cylindrical shape disposed generally transverse with respect to the first plate and the second plate.

17. The apparatus for boresighting a device relative to position of claim 16, wherein the second plate further comprising sidewalls.

18. A method for boresighting a first device with respect to a boresight of a second device, the method comprising:

mounting the first device on a first plate of an apparatus, wherein the first plate adjustably engages a second plate by a pivot rod and the second plate mounts with respect to a pan and tilt;

mounting the second device on the pan and tilt;

calibrating least one of the yaw angle and the pitch angle of the first plate with respect to the second plate; and fixing the position of the first plate with respect to the second plate by at least one fastener.

19. The method for boresighting a first device with respect to a boresight of a second device of claim 18, wherein the calibrating intersects a boresight of the first device and a boresight of the second device at a calibration distance from the apparatus.

20. The method for boresighting, a first device with respect to a boresight of a second device of claim 19, wherein in the calibration distance is about 200 m to about 700 m.

21. The method for boresighting a first device with respect to a boresight of a second device of claim 18, further comprising:

loosening a front fixing bolt, a back fixing bolt, a side fixing screw and an opposite side fixing screw;

moving the first plate to adjust the yaw angle to the desired position of the first plate before tightening the side fixing screw and the opposite side fixing screw; and moving the first plate to adjust the pitch angle to the desired position of the first plate with respect to the pivot rod by moving the back fixing bolt and then tightening the front fixing bolt.

22. The method for boresighting a first device with respect to a boresight of a second device of claim 21, further comprising tightening the side fixing screw and the opposite side fixing screw after tightening the front fixing bolt.

* * * * *